United States Patent
Wenzel et al.

[11] Patent Number: 6,164,829
[45] Date of Patent: Dec. 26, 2000

[54] BEARING SHELL

[75] Inventors: Frank Wenzel, Düsseldorf; Sven Helgi Orend, Aachen; Theo Heep, Krefeld, all of Germany

[73] Assignee: TRW Fahrwerksysteme GmbH & Co. KG, Dusseldorf, Germany

[21] Appl. No.: 09/290,744

[22] Filed: Apr. 13, 1999

[30] Foreign Application Priority Data

May 28, 1998 [DE] Germany .................. 198 23 781

[51] Int. Cl.$^7$ .................................... F16C 23/04
[52] U.S. Cl. .................. 384/203; 384/206; 403/135
[58] Field of Search .................. 384/206, 203, 384/208, 192; 403/122, 124, 135, 137, 138, 140

[56] References Cited

U.S. PATENT DOCUMENTS

| | | | |
|---|---|---|---|
| 3,226,141 | 12/1965 | Sullivan, Jr. .................. | 384/203 X |
| 3,411,815 | 11/1968 | Sullivan ....................... | 403/138 |
| 4,591,276 | 5/1986 | Schneider et al. ............ | 384/206 |
| 4,615,638 | 10/1986 | Ito ............................... | 384/203 X |
| 4,904,107 | 2/1990 | Fukukawa et al. ............ | 403/122 |
| 5,758,986 | 6/1998 | Kraps ........................... | 403/135 |

*Primary Examiner*—Thomas R. Hannon
*Attorney, Agent, or Firm*—Tarolli, Sundheim, Covell, Tummino & Szabo L.L.P.

[57] ABSTRACT

To provide a simple and quality improving manufacturing process for a bearing shell, particularly for rotatable and, to a limited extent, tiltable support of a ball pivot in a joint housing of a ball-and-socket joint comprising a one-piece ball socket (1) made of plastic, in which a ball above and below its equatorial plane (6) is supportable in form-fit manner at least in a spherical zone (7) along the inner surface (3) of the ball socket (1), it is proposed to provide the ball socket (1), which has a closed lateral surface (8), with elastically deformable segments (2) extending substantially meridionally in axial direction. Furthermore proposed is a ball-and-socket joint with a bearing shell (1) formed in this manner.

13 Claims, 2 Drawing Sheets

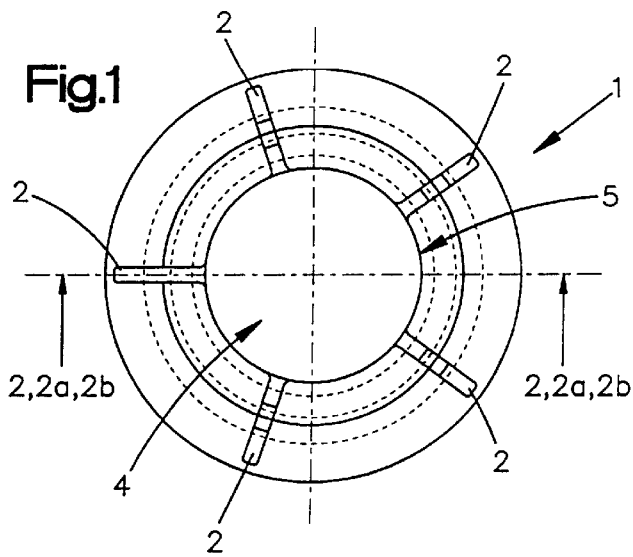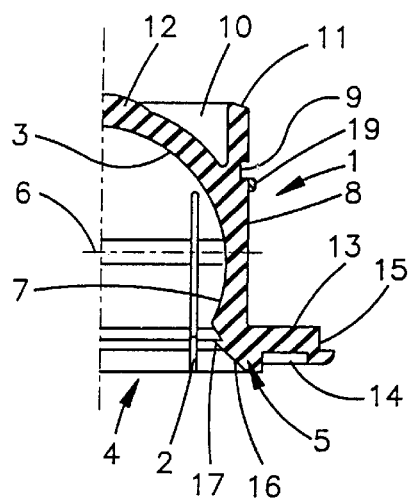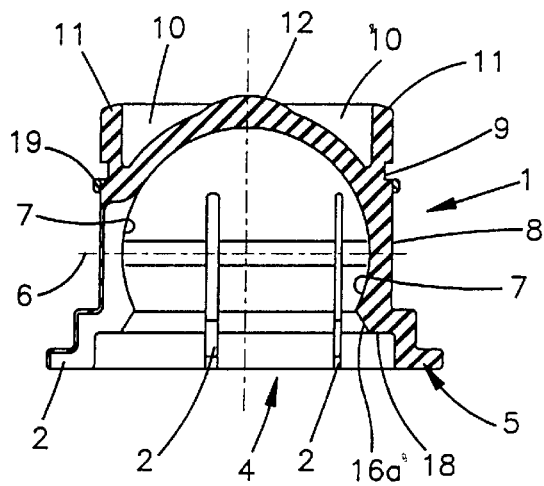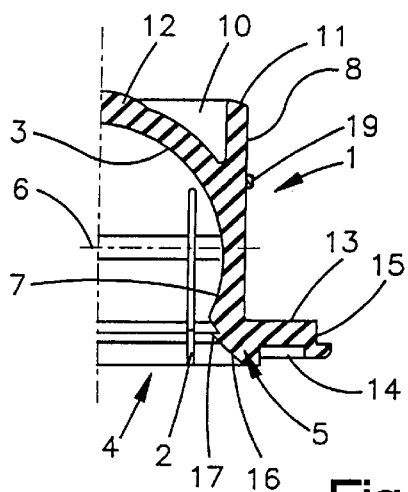

BEARING SHELL

The invention relates to a bearing shell, particularly for rotatable and, to a limited extent, tiltable support of a ball pivot in a joint housing of a ball-and-socket joint, comprising a one-piece ball socket made of plastic, in which a ball is form-fittingly supportable above and below its equatorial plane at least in a spherical zone along the interior surface of the ball socket. The invention furthermore relates to a ball-and-socket joint.

Such bearing shells are typically used for ball-and-socket joints, which are known in a wide variety of embodiments, particularly in vehicle construction. As a rule, the ball-and-socket joints have a joint housing in which a ball with a ball pivot is rotatably and, to a limited extent, tiltably arranged. To obtain the desired material pairing and friction properties of the ball seat independently of the joint housing, which is preferably made of metal or plastic, a bearing shell is arranged in the joint housing, which form-fittingly receives the ball in an interference fit. The one-piece bearing shells made of plastic thus have an overlap with respect to the equator of the ball, which is necessary, in particular, to prevent the ball pivot from being pulled out of the joint housing upon the occurrence of axial load components.

In prior art it is known that such an overlap can be obtained by adjoining a cylindrical portion to the portion of the bearing shell supporting the surface of the ball above the ball equator, which during assembly of bearing shell and ball pivot permits the passage of the ball and which, after insertion of the ball provided with its bearing shell into the opening of the joint housing, is then formed into a ball race shape by deforming the joint housing edge such that the ball surface below the ball equator is likewise supported in the bearing shell, so as to produce the overlap in this manner. The disadvantage is that due to the deformation of the bearing shell, undefined internal stresses develop. This results in locally increased compression conditions between the bearing shell and the adjacent ball or the joint housing with a corresponding risk of inadequate lubrication and stick-slip effects. To obtain defined and constant joint properties over the life of the joint, these internal stresses must therefore be reduced through costly secondary heat treatments.

To reduce the assembly-related costs, it has been proposed to provide the bearing shell with slit-type openings to permit deformation and thus insertion of the ball. This has the disadvantage that dirt particles can enter through the slits and cause, for example, corrosion of the ball pivot, which significantly impairs the properties and the life of the joint. Furthermore, manufacturing processes are increasingly used, in which, after the bearing shell has been mounted on the ball, the ball pivot is placed into a split injection mold and plastic is injected around it to manufacture the joint housing. Since the plastic is injected into the mold at high pressure, there is a risk that plastic will enter through the slit-shaped openings and get between the bearing shell and the ball, so that the ball-and-socket joint becomes unusable.

Thus, the object of the invention is further to develop a bearing shell so as to eliminate the aforementioned disadvantages and achieve a simple manufacturing process and improve quality.

According to the invention, this object is attained with a bearing shell of the initially described type in that a ball socket with a closed lateral surface is provided with elastically deformable segments extending substantially meridionally in axial direction.

A bearing shell thus designed has the requisite deformabiity to permit insertion of, for example, a ball to form a ball-and-socket joint without plastic deformation of the shell contour. The closed lateral surface of the ball socket furthermore ensures that no dirt particles can enter between the bearing shell and the ball and permits direct injection molding around the bearing shell to produce the joint housing. The elastically deformable segments make it possible to fabricate the rest of the bearing shell out of hard plastic, for example, in order to ensure a long-lived interference fit of the ball within the bearing shell.

In a preferred embodiment of the invention, the elastically deformable segments are made as groove shaped recesses along the interior surface of the ball socket. This offers a simple and cost-effective manufacturing process in that the bearing shell is produced, for example, by injection molding around a male core die. The groove shaped recesses provide the necessary elasticity for removing the male core die after the injection molding process. The grooves may be filled with a flexible material.

According to an alternative embodiment of the invention, the elastically deformable segments are slit-shaped openings in the lateral surface of the ball socket, which are filled with a flexible material. Thus, the closed lateral surface again ensures that a bearing shell installed, for example, in a joint housing does not cause corrosion of the ball pivot due to penetration of dirt particles, water or the like between bearing shell and ball.

It is particularly advantageous if the elastically deformable segments are uniformly distributed over the entire lateral surface of the ball socket such that identical compliant properties of the bearing shell result in all radial directions. In contrast, an additional characteristic of the invention provides that if the bearing shell is used for ball-and-socket joints in a vehicle steering tie rod where different lateral forces must be compensated when driving around curves, the elastically deformable segments can be distributed over only a partial area of the lateral surface of the ball socket. The resulting different compliant properties of the bearing shell make it possible to absorb the impact load during driving.

According to a further development of the invention, the elastically deformable segments extend from the rim surrounding the receiving-side opening of the ball socket up to above the equatorial plane of the spherical zone of the interior surface of the ball socket. This ensures the requisite deformability in the area of the overlap required for inserting a ball or removing a male core die, while providing adequate rigidity in the closed spherical cap-shaped segment of the ball socket to brace, for example, the bearing shell in a joint housing. The rim surrounding the receiving-side opening of the ball socket is advantageously formed as a collar-shaped flange provided with a ring groove on the end face on the side of the opening of the ball socket and a radial shoulder on the opposite side. This makes it possible by a correspondingly shaped mounting element centered in the end face-side groove and having a projection engaging with the radial shoulder to create a detachable snap connection for fixing, for example, sealing bellows to the bearing shell.

It is furthermore advantageous if the rim surrounding the opening of the ball socket on the side facing the opening is formed as a stop face tapering conically toward the spherical zone of the interior surface of the ball socket or as a stepped stop face to limit the swing of a ball pivot received in the ball socket.

According to a further characteristic of the invention, a ring groove is disposed on the outer lateral surface of the ball socket, by means of which the bearing shell may be braced in form-fit manner, for example, in a joint housing. To compensate dimensional tolerances regarding the mounting height of for example a joint housing, which are caused by local plastic deformation of the bearing shell material, a further advantageous development of the invention provides for a ring-shaped flange to be disposed on the outside of the ball socket concentrically to its closed spherical cap-shaped segment.

The invention furthermore proposes a ball-and-socket joint, particularly for motor vehicles, with a ball-ended pivot, which is rotatably and, to a limited extent, tiltably supported in a bearing shell, which is arranged in a joint housing and sealed by sealing bellows at its opening facing the ball pivot, which is distinguished by the use of the previously described bearing shell. It is thereby particularly advantageous if the bearing shell is braced in form-fit manner by means of a ring groove arranged on its outer lateral surface within the joint housing of the ball-and-socket joint to provide a particularly simple mount. Finally, it is proposed that the sealing bellows of the ball-and-socket joint be detachably fixable to the collar-shaped flange of the bearing shell through a snap connection to ensure simple assembly on the one hand and recycling oriented separation on the other.

According to an advantageous proposal of the invention, the ball socket is provided with a bead ring in the circumferential area adjoining the ring groove that is intended for bracing. This ring may be formed as an integral part of the ball socket or may be formed in addition, preferably of an elastic material. The purpose of this bead ring is to form a sealing lip, which is displaced into the ring groove during insertion, for example, into a joint housing. This provides a further seal of the underlying area. Advantageously, the ring groove can have various depths across its circumference to provide automatic locking against rotation. For this purpose, the ring groove may, for example, be hexagonal in shape.

Additional details, features, and advantages of the subject of the invention result from the following description of preferred embodiments, which are depicted in the drawing, wherein FIG. 1 shows a bottom view of a ball socket provided with groove-shaped recesses.

FIG. 2 is a longitudinal section along line II—II in FIG. 1.

FIG. 2a is a longitudinal section along line IIa—IIa in FIG. 1 of an alternative embodiment and FIG. 2b is a longitudinal section along line IIb—IIb in FIG. 1 of an additional alternative embodiment.

Figure 2C:
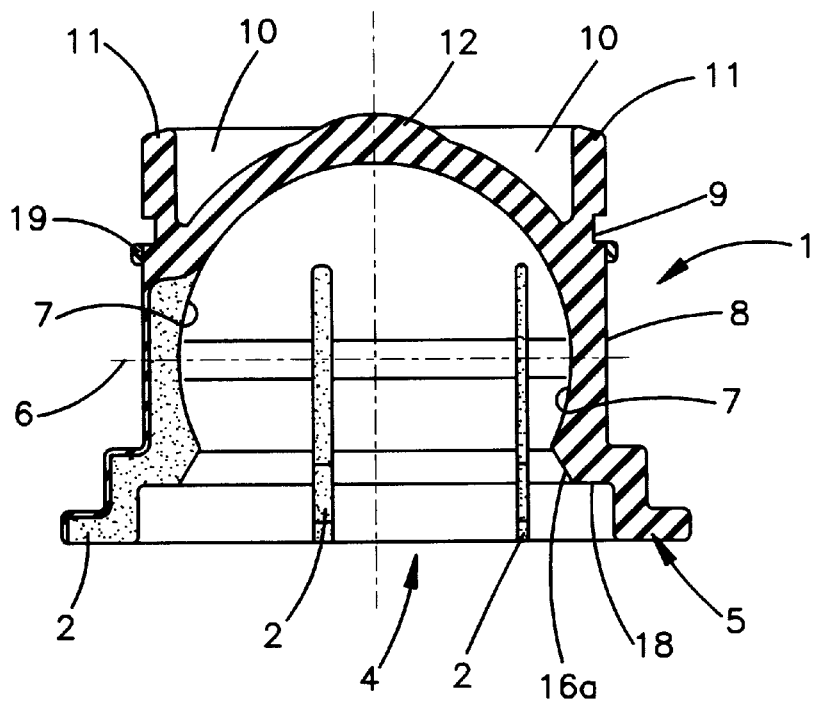
FIG. 2c is a longitudinal section along line II—II in FIG. 1 of an alternative embodiment.

The ball socket 1 shown in FIG. 1 has five groove-shaped recesses 2, which are equally spaced across the entire lateral surface and extend substantially meridionally in axial direction along the interior surface 3 of ball socket 1, as is particularly evident in FIG. 2. The groove-shaped recesses 2 extend from rim 5 surrounding the receiving-side opening 4 of ball socket 1 up to above the equatorial plane 6 of a spherical zone 7 of the interior surface 3 of ball socket 1.

The ball sockets 1 depicted in FIG. 2 and 2a, in contrast to the ball socket 1 shown in FIG. 2b, have a ring groove 9 on their outer lateral surface 8, which in the drawing is disposed slightly above the end of groove shaped recesses 2. On the outside of ball socket 1, a ring-shaped flange 11 is disposed so as to form a ring-shaped recess 10. This flange concentrically surrounds a closed spherical cap-shaped segment 12 of the ball socket and is formed onto ball socket 1 approximately at the height of ring groove 9.

In the embodiments of ball socket 1 depicted in FIG. 2a and 2b, rim 5 surrounding opening 4 is formed as a collar shaped flange 13, which is provided with a ring groove 14 on its end face on the side of opening 4 and a radial shoulder 15 on the opposite side. The side facing opening 4 of the collar shaped flange 13 is formed as a stop face 16 conically tapering to the spherical zone 7 of the interior surface 3 of ball socket 1, which merges into the spherical zone 7 of interior surface 3 via a transitional segment 17. In contrast, in the embodiment of ball socket 1 depicted in FIG. 2, rim 5 surrounding opening 4 is provided with a stepped shoulder 18 on the side facing opening 4, which opens into the spherical zone 7 via a conically tapering stop face 16a.

Ball socket 1, which is a one-piece injection molded plastic part, has adequate deformation elasticity due to the groove shaped recesses 2 to be unmolded from a male core die located in the interior of ball socket 1 after injection molding, without any plastic deformation of the interior contour of ball socket 1, particularly of the interference fit in spherical zone 7 required to receive the ball of a ball pivot in form-fit manner. The groove shaped recesses 2 are formed only along the interior surface 3 of ball socket 1. This results in a closed lateral surface 8 along the outside of ball socket 1 to prevent any dirt particles or water from entering between ball socket 1 and the ball of the ball pivot when the ball pivot is inserted. This prevents corrosion-related influences on the ball pivot to ensure precise joint motion and a long joint life. FIG. 2c shows a bearing shell with elastically deformable segments, whereby these segments are slit-shaped openings in the lateral surface 8 of the ball socket 1, which are filled with a flexible material. In the figure, the flexible material is pointed out by dots.

To fix ball socket 1 in a simple manner, for example, in a joint housing, circumferential ring groove 9 is provided on the outer lateral surface 8, which during bracing in a joint housing in conjunction with a corresponding projection ensures that ball socket 1 is fixed within the joint housing by an interference fit. The circumferential ring groove furthermore creates a defined end position of ball socket 1 within the joint housing. Manufacturing related tolerances of the joint housing are compensated by the ring-shaped flange 11, in that flange 11 is plastically deformable to the size of the inside diameter of a recess in the joint housing intended to receive ball socket 1.

Finally, simple and fast mounting of the sealing bellows on ball socket 1 is provided by ring groove 14 and shoulder 15 on the collar shaped flange 13. A fastening element for the sealing bellows provided with a projection engaging with ring groove 14 makes it possible to center the sealing bellows on ball socket 1, while an elastic projection of the fastening element encompassing shoulder 15 fixes the fastening element in a snap connection to the collar shaped flange 13.

Figure 2D:
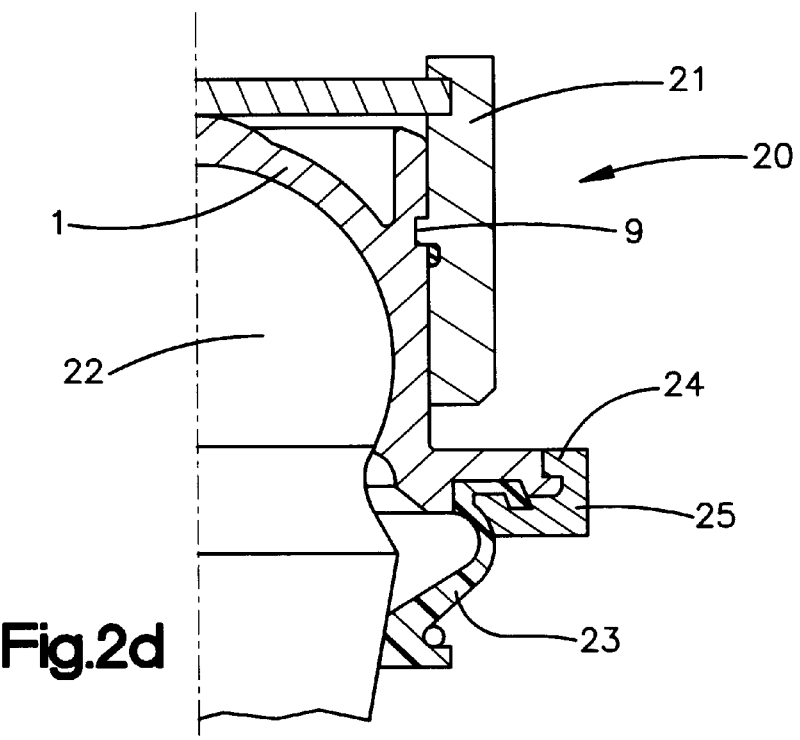
FIG. 2d is a partial sectional view of a ball-and-socket joint with a bearing shell according to FIG. 1.

FIG. 2d shows a ball-and-socket joint 20. The ball-and-socket joint 20 comprises a ball-ended pivot 22, which is rotatably and, to a limited extent, tiltably supported in the bearing shell. The bearing shell itself is arranged in a joint housing 21, which is sealed by sealing bellows 23 along the opening facing the ball pivot 22. The bearing shell 1 is held by bracing in form-fit manner within the joint housing 21 by means of the ring groove 9 disposed on its outer lateral surface 8. The sealing bellows 23 are detachably fixable to the collar shaped flange 13 of the bearing shell 1 by a fastening element 25, while an elastic projecting part 24 of the fastening element fixes the fastening element 25 in a snap connection.

The above embodiments of a bearing shell permit simple production and improve quality. A contributing factor is the elastic deformability of ball socket 1 due to the groove shaped recess 2, as it prevents a plastic deformation of the interior contour of ball socket 1 during unmolding from a male core die after injection molding or during insertion of the ball end of a ball pivot. The closed lateral surface 8 of ball socket 1 furthermore ensures the requisite interference fit of the ball of a ball pivot necessary for a long-lived motion precision of a ball-and-socket joint, and protects the ball pivot from harmful influences, for example penetration of water or dirt particles. Finally, the embodiment of the collar shaped flange 13 as a snap connection permits simple mounting of sealing bellows.

FIGS. 2, 2a, and 2b show a sealing bead 19 below ring groove 9, which forms a circumferential sealing lip. When the ball socket is inserted, for example, into a joint housing, the sealing bead material is displaced into the ring groove and thus produces an excellent seal. Ring groove 9 can have different circumferential depths to produce different material bracing, which automatically provides a lock against rotation. A polygonal shape of the ring groove or the sealing bead can also support a lock against rotation.

What is claimed is:

1. Bearing shell, for rotatable and, to a limited extent, tiltable support of a ball pivot in a joint housing of a ball-and-socket joint comprising a one-piece ball socket (1) made of plastic, in which a ball is form-fittingly supportable above and below its equatorial plane (6) at least in a spherical zone (7) along interior surface (3) of ball socket (1), characterized in that ball socket (1) having a closed lateral surface (8) is provided with elastically deformable segments (2) extending substantially meridionally in axial direction.

2. Bearing shell according to claim 1 characterized in that the elastically deformable segments are made as groove shaped recesses (2) along the interior surface (3) of the ball socket (1).

3. Bearing shell according to claim 1 characterized in that the elastically deformable segments are slit-shaped openings in the lateral surface (8) of the ball socket (1), which are filled with a flexible material.

4. Bearing shell according to claim 1 characterized in that the elastically deformable segments (2) are uniformly distributed over the entire lateral surface (8) of the ball socket (1).

5. Bearing shell according to claim 1 characterized in that the elastically deformable segments (2) are distributed over a partial area of the lateral surface (8) of the ball socket (1).

6. Bearing shell according to claim 1 characterized in that the elastically deformable segments (2) extend from the rim (5) surrounding opening (4) of joint socket (1) on the receiving side up to above the equatorial plane (6) of the spherical zone (7) of the interior surface (3) of the ball socket (1).

7. Bearing shell according to claim 1 characterized in that rim (5) surrounding opening (4) of the ball socket (1) on the receiving side is made as a collar shaped flange (13), which is provided with an end face ring groove (14) on the side of opening (4) of the ball socket (1) and a radial shoulder (15) on the opposite side.

8. Bearing shell according to claim 1 characterized in that rim (5) surrounding opening (4) of the ball socket (1) on the side facing opening (4) is formed as a stop face (16, 16a) conically tapering toward the spherical zone (7) of interior surface (3) of ball socket (1) or as a stepped stop face (16, 16a).

9. Bearing shell according to claim 1 characterized in that a ring groove (9) is arranged on the outer lateral surface (8) of ball socket (1).

10. Bearing shell according to claim 1 characterized by a ring-shaped flange (11) arranged on the outer side of the ball socket (1) concentrically to its closed spherical cap-shaped segment (12).

11. Ball-and-socket joint with a ball-ended pivot, which is rotatably and, to a limited extent, tiltably supported in a bearing shell arranged in a joint housing, which is sealed by sealing bellows along the opening facing the ball pivot, characterized by a bearing shell according to claim 1.

12. Ball-and-socket joint according to claim 11 characterized in that the bearing shell (1) is held by bracing in form-fit manner within the joint housing by means of the ring groove (9) disposed on its outer lateral surface (8).

13. Ball-and-socket joint according to claim 11 characterized in that the sealing bellows are detachably fixable to the collar shaped flange (13) of the bearing shell (1) by a snap connection.

* * * * *